(12) United States Patent
Baechtel et al.

(10) Patent No.: US 9,022,200 B2
(45) Date of Patent: May 5, 2015

(54) ACCUMULATION CONVEYOR

(71) Applicant: TRIO PAC Inc., St-Laurent (CA)

(72) Inventors: Jean-Claude Baechtel, Laval (CA); Jean-Claude Espitalier, Candiac (CA)

(73) Assignee: TRIO PAC Inc., St-Laurent, Québec (CA)

( * ) Notice: Subject to any disclaimer, the term of this patent is extended or adjusted under 35 U.S.C. 154(b) by 78 days.

(21) Appl. No.: 14/064,598

(22) Filed: Oct. 28, 2013

(65) Prior Publication Data

US 2014/0116846 A1    May 1, 2014

Related U.S. Application Data

(60) Provisional application No. 61/719,553, filed on Oct. 29, 2012.

(51) Int. Cl.
*B65G 47/26* (2006.01)
*B65G 47/51* (2006.01)

(52) U.S. Cl.
CPC .......... *B65G 47/5131* (2013.01); *B65G 47/268* (2013.01)

(58) Field of Classification Search
CPC .......................... B65G 47/268; B65G 47/5131
See application file for complete search history.

(56) References Cited

U.S. PATENT DOCUMENTS

| | | | | |
|---|---|---|---|---|
| 4,549,647 | A * | 10/1985 | Cosse | 198/461.1 |
| 7,032,742 | B2 * | 4/2006 | Hartness et al. | 198/594 |
| 7,191,896 | B2 | 3/2007 | Hartness et al. | |
| 7,222,723 | B2 * | 5/2007 | Horton et al. | 198/594 |
| 7,926,642 | B2 * | 4/2011 | Huttner et al. | 198/347.1 |
| 8,573,380 | B2 * | 11/2013 | Petrovic | 198/347.4 |
| 8,622,201 | B2 * | 1/2014 | Seger et al. | 198/778 |
| 2013/0062165 | A1 * | 3/2013 | Touitou et al. | 198/606 |
| 2013/0284563 | A1 * | 10/2013 | Lopez et al. | 198/459.1 |
| 2014/0110221 | A1 * | 4/2014 | Deflandre | 198/431 |

FOREIGN PATENT DOCUMENTS

CA    2768400    2/2011

* cited by examiner

*Primary Examiner* — Gene Crawford
*Assistant Examiner* — Thomas Randazzo
(74) *Attorney, Agent, or Firm* — Myers Wolin, LLC

(57) ABSTRACT

A line accumulation conveyor includes a secondary belt rotatably mounted to a frame so as to define upper and lower surfaces caused to move in opposite directions by rotation of the secondary belt. The conveyor further includes a product conveying belt that is rotatably engaged with the secondary belt at a first position on the first surface and at a second position on the second surface therebetween in an endless manner. The product conveying belt has an upper portion that extends from the first surface in an upper plane between the first position and a looping portion of the product conveying belt and a lower portion that extends from the second surface in a lower plane between the looping portion and the second position. The upper portion of the product conveying belt defines a product accumulation path that can be elongate or shorten by rotating the secondary belt.

12 Claims, 3 Drawing Sheets

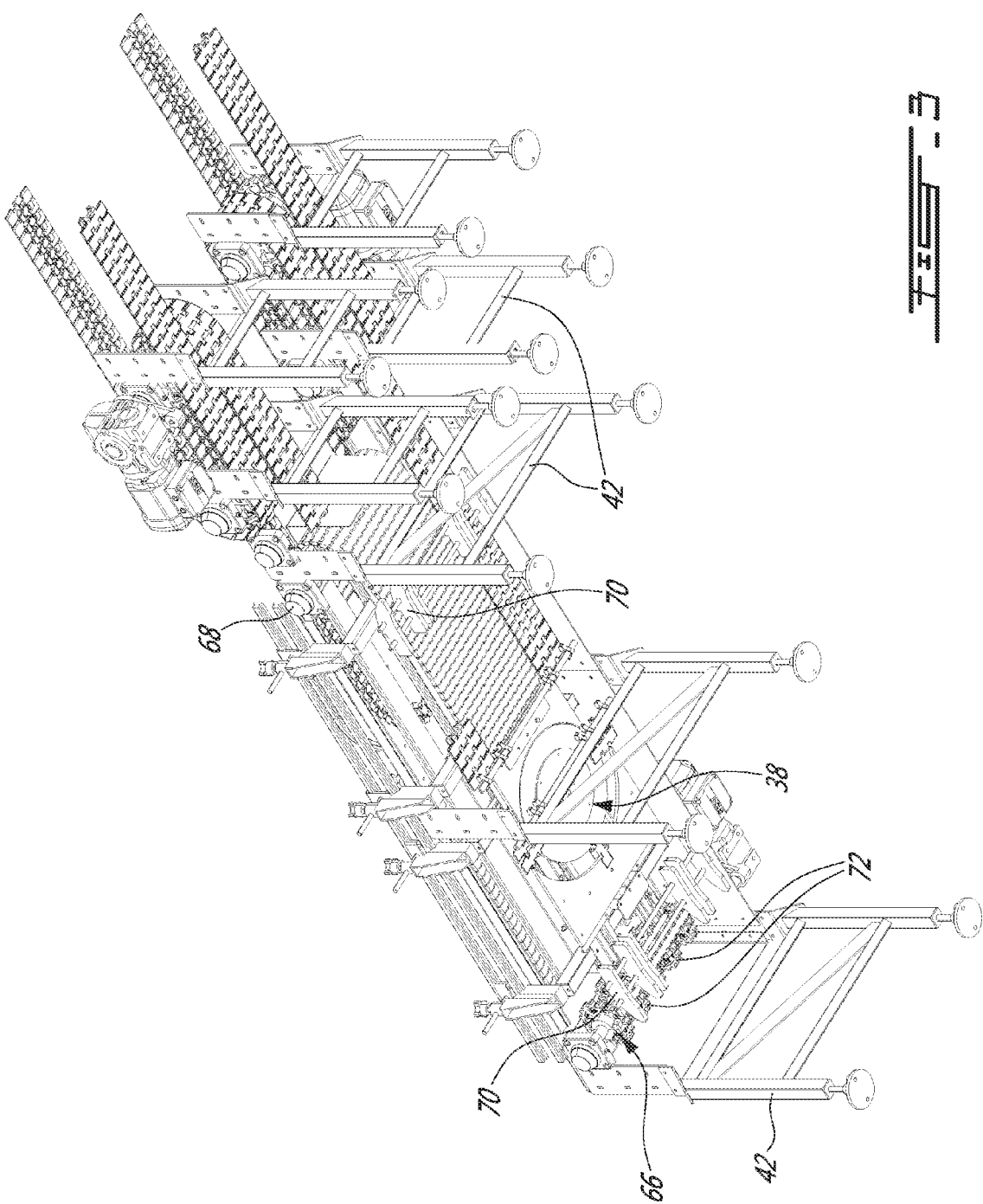

ACCUMULATION CONVEYOR

CROSS REFERENCE TO RELATED APPLICATIONS

This application claims the benefit of U.S. Application No. 61/719,553, filed Oct. 29, 2012, the contents of which are incorporated by reference herein.

FIELD

The present disclosure generally relates to conveying system. More specifically, the present disclosure concerns a single line accumulator.

BACKGROUND

It is well-known in the art of line production to provide an accumulation conveyor between a product conveyor and a product processing station. Such an accumulation conveyor allows to move the products along an expandable travel path whose length is adjusted with the fluctuation in product processing production.

Some accumulation conveyors include one or more adjacent lines, each having parallel infeed and discharge belt sides. The travel path is adjusted by varying the length of each line by moving a main carriage therealong. A secondary carriage is provided, usually behind the main carriage in a back to back configuration, to close the loop of the transport belt. Both carriages are movable in unison via a secondary belt.

A first drawback of such line accumulation conveyors is that they require frequent tension adjustment of their secondary belt. The tensioning is either performed by a maintenance worker or automatically by a tensioning mechanism provided thereon.

Another drawback of conventional line accumulation conveyors is that they require a relatively large amount of space that is not used for the accumulation function.

SUMMARY

In illustrative embodiments, the drawback of loosening of the secondary belt between the main and secondary end carriages in a line accumulation conveyor is solved by relatively positioning both end carriages between the main belt so that the main belt exerts pressure in opposite directions on respective end carriages. This can be achieved by positioning the secondary end carriage in a plane parallel to the plane defined by the main carriage thereunder.

More specifically, in accordance to illustrated embodiments there is provided a line accumulation conveyor comprising a product moving belt rotatably mounted between two end carriages that are so integrated into a secondary belt that the product moving belt exerts a pressure in opposite direction on the two end carriages; the product moving belt having a portion defining a product accumulation path that is variable by moving the secondary belt.

According to other embodiments, there is provided a line accumulation conveyor comprising:
a frame;
a secondary belt rotatably mounted to the frame so as to define upper and lower surfaces that are caused to move in opposite directions by a rotation of the secondary belt; and
a product conveying belt rotatably engaged with the secondary belt at a first position on the first surface and at a second position on the second surface therebetween in an endless manner; the product conveying belt having an upper portion that extends from the first surface in an upper plane between the first position and a looping portion of the product conveying belt and a lower portion that extends from the second surface in a lower plane between the looping portion and the second position; the upper portion of the product conveying belt defining a product accumulation path;
whereby, in operation, the product accumulation path is modified by rotating the secondary belt.

According to a more specific embodiment, there is provided a line accumulation conveyor comprising:
a frame;
a secondary belt rotatably mounted to the frame so as to define upper and lower surfaces that are caused to move in opposite directions by a rotation of the secondary belt;
a product conveying belt rotatably engaged with the secondary belt by upper and lower carriages integrated respectively into the upper and lower surfaces of the secondary belt for rotation about respective axes perpendicular to the upper and lower surfaces in an endless manner; the product conveying belt being motorized by a drive mechanism; the product conveying belt having an upper portion that extends from the first surface in an upper plane between the upper carriage and a looping portion of the product conveying belt and a lower portion that extends from the second surface in a lower plane between the looping portion and the lower carriages; the upper portion of the product conveying belt defining a product accumulation path; and
a carriage-positioning mechanism that cooperates with the secondary belt to cause the secondary belt to rotate;
whereby, in operation, the product accumulation path is modified by rotating the secondary belt.

According to other embodiments, there is provided a line accumulation conveyor comprising a product moving belt rotatably mounted between two end carriages that are so integrated into a secondary belt that the product moving belt exerts a pressure in opposite direction on the two end carriages; the product moving belt having a portion defining a product accumulation path that is variable by moving the secondary belt.

Other objects, advantages and features of the single line accumulator will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 3 is a bottom perspective view of the accumulation conveyor from FIG. 1.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

Figure 1:
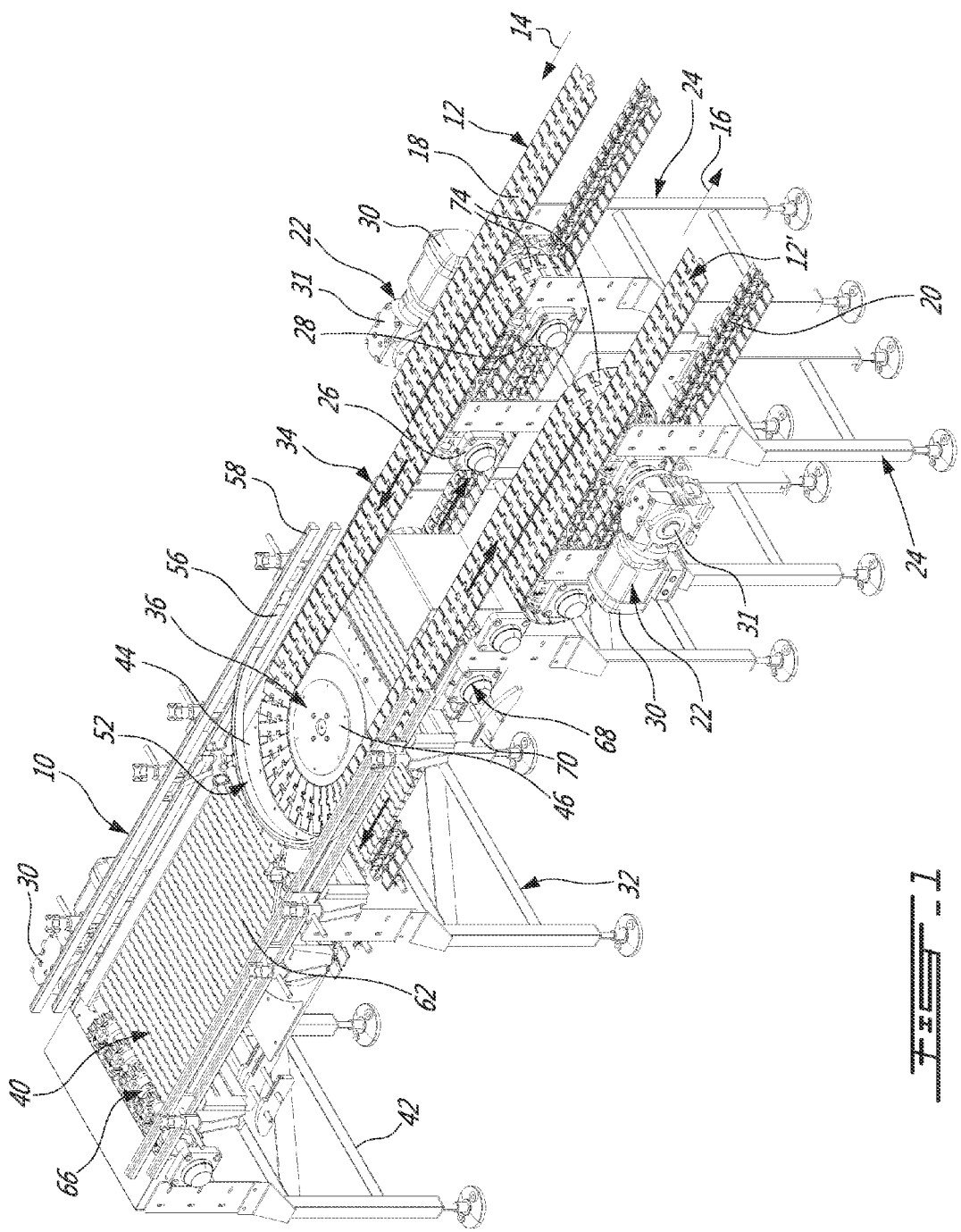
FIG. 1 is a top perspective view of a single line accumulation conveyor according to an illustrative embodiment; the accumulation conveyor being shown downstream from and coupled to another conveyor.
Figure 2:
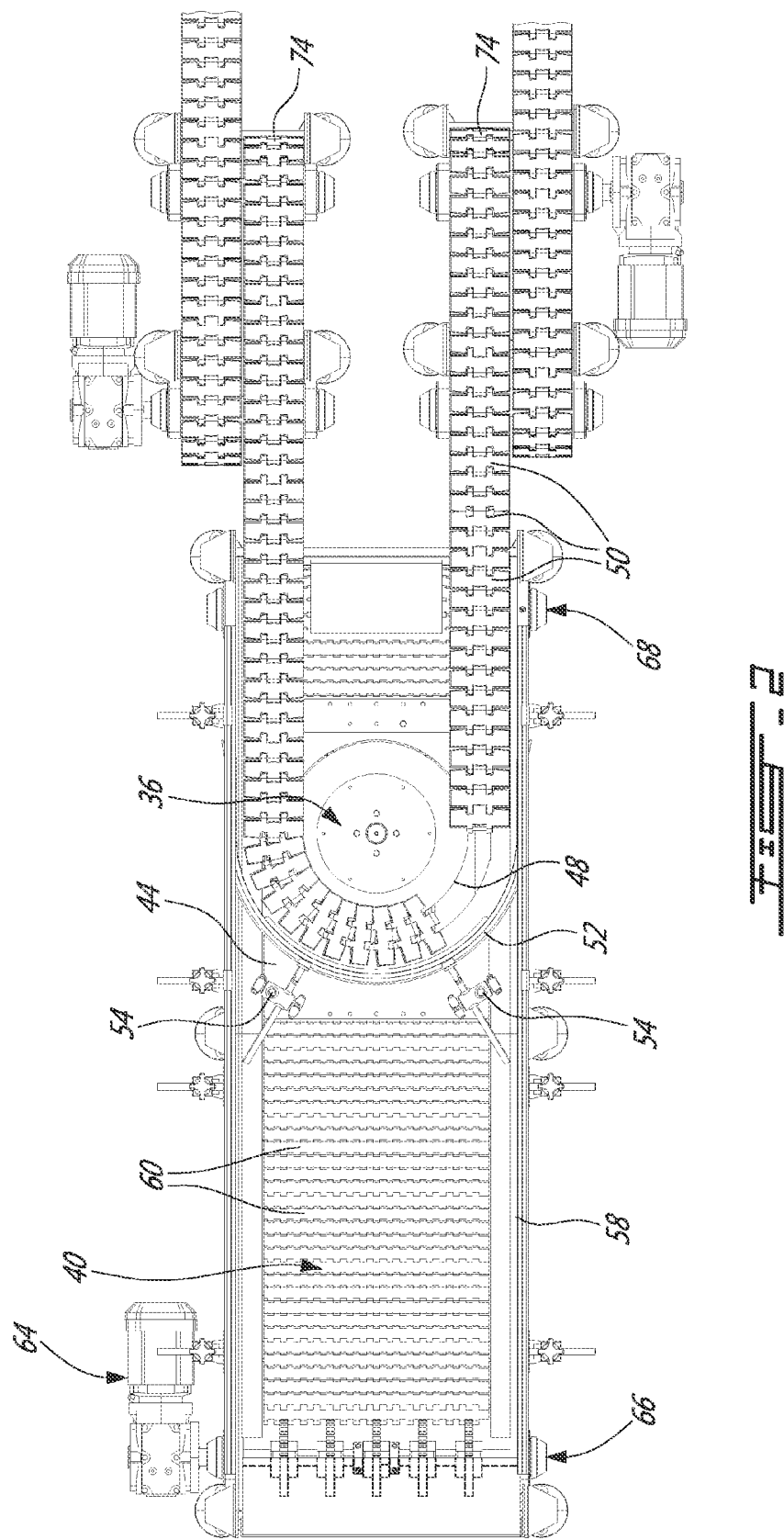
FIG. 2 is a top plan view of the accumulation conveyor from FIG. 1.

An illustrative embodiment of an accumulation conveyor 10 is illustrated in FIGS. 1 to 3. The accumulation conveyor 10 is shown in FIGS. 1 to 3 adjacent product transfer conveyors 12-12'.

The product transfer conveyors 12-12' allow transferring products within an assembly line (not shown) onto the accumulation conveyor 10 (see arrow 14) and therefrom (see arrow 16). The product transfer conveyors 12-12' includes respective first and second parallel chain belts 18 and 20 that are endlessly mounted to respective drive mechanisms 22 (only partially shown) for rotation in opposite directions.

Each drive mechanism 22 includes gear assemblies 26 and 28 that operatively mount a respective one of the chain belts 18 and 20 to a respective table frame 24 in a conventional endless manner. Each drive mechanism 22 also includes a motor 30 operatively coupled to one of the gear assemblies 26 and 28 via a gearbox 31.

The accumulation conveyor 10 includes a table frame 32, a product conveying belt 34 endlessly mounted to top and bottom end carriages 36 and 38, and a carriage-positioning mechanism 40 for causing the top and bottom carriages 36 and 38 to move in unison along the table frame 32. The belt 34 is coupled to one of the drive mechanisms 22 so as to be driven thereby. In the drawings, some belt links have been omitted so that some components of the conveyor underneath the belt be visible.

The product conveying belt 34 is received between the two end return carriages 36-38 so that the belt 34 defines two parallel back and forth conveying tracks. The belt 34 is also supported and driven by the drive mechanisms 22 shared with the conveyor 12'.

Contrarily to accumulation conveyor from the prior art, the end carriages 36 and 38 are not located within a same plane. As will be described herein below in more detail, a first end carriage 36 is generally positioned within the conveying plane where products are received, and the other end carriage 38 is positioned in lower plane parallel the conveying plane so that they operate in opposite direction.

The end carriages being positioned in respective parallel top and bottom planes, a first portion of the two parallel back and forth conveying tracks defined by the belt 34 is positioned within a top plane shared by the top portions of the belts 18 and 20, and a second folded portion of the two parallel back and forth conveying tracks is positioned within a bottom plane under the top plane and parallel thereof.

The intersection between the first and second portions of the two parallel back and forth conveying tracks of the accumulation conveyor 10 defines a product transfer end of the conveyor 10. The length of the chain belt 34 between the end carriage 36 and the product transfer end defines the product accumulation path.

The table frame 32 includes a plurality of easels 42 of similar height that support and operatively position the belt 34 via the drive mechanisms 22, end carriages 36 and 38, and carriage-positioning mechanism 40 relative to the product transfer conveyors 12-12'. As shown in the Figures, other frame elements are provided to assemble and position the mechanisms 34 to 40 of the conveyor 10. These elements will not be described herein in more detail for concision purposes.

Also, the expressions "table frame" and "frame" should be construed in the specification and claims as including any assembly and/or support element provided for the relative and functional positioning of the functional components of the accumulation and product transfer conveyors 10 and 12-12'.

Each components of the accumulation conveyor 10 will now be described in more detail.

The product conveying belt 34 is rotatably engaged with the secondary belt within the conveying plane via the top carriage 36 and at a second position on the lower plane via the bottom carriage 38 in an endless manner. The product conveying belt 34 is further engaged and motorized by the drive mechanism 22 that creates back and forth looping portions 74 of the belt 34 that allows the continuous movement of the belt 34 between the top conveying and bottom planes.

The top end carriage 36 includes a rectangular plate 44 mounted to the table 32 for longitudinal reciprocal translation movement thereon and a turntable 46 rotatably mounted to the plate 44. The rectangular plate 44 is provided with a C-shaped groove 48 that receives link elements 50 of the belt 34 for sliding movement therein. In operation, rotation of the turntable 46 causes the belt 34 to move along the groove 48.

A C-shaped rail 52 is fixedly mounted to the plate 44 via mounting brackets 54. The lateral straight portions 56 of the rail 52 are both slidably received in side rails 58 secured to the table frame 32 on both lateral sides thereof.

Since the bottom carriage 38 is similar to the top carriage, only the differences between both carriages 38 and 36 will be described herein for concision purposes.

Similarly to the top carriage 36, the bottom carriage 38 allows receiving the belt 34 so as to yield a second loop thereof.

Since the portion of the belt 34 under the table 32 is not intended to receive products, the bottom carriage 38 does not include rails 52 and 58.

It is to be noted that the rail 52 can be omitted also on the top plane, for example when the products moved by the conveyor 10 have a low gravity center and/or depending on the conveying speed and/or size of the product relative to the width of the belt 18.

Also, according to another embodiment (not shown), the carriages 36 and 38 are replaced by another belt engaging mechanism (not shown), such as a circular or semi-circular fixed guide rail or disk.

The carriage-positioning mechanism 40 includes link elements 60 that interconnects the top and bottom end carriages 36-38 so as to form a secondary endless belt 62 therewith.

The mechanism 40 further includes a drive mechanism 64, similar to the drive mechanism 22, that mounts the belt 62 to the table 32 for endless movement thereon. More specifically, the drive mechanism 64 includes two longitudinal end roll assemblies 66 and 68 that are rotatably mounted to the table 32. Each roll assembly 66-68 includes a plurality of sprockets 72 that are dimensioned for cooperation with the belt link elements 60 so that the roll assemblies 66-68 and belt 62 rotate in unison.

One of the roll assemblies 66 and 68 is coupled to a motor 30 so as to be motorized therefrom. The carriage positioning mechanism 40 further includes belt-guiding elements 70 mounted to the table 32 adjacent both longitudinal ends thereof.

The secondary endless belt 62 defines upper and lower surfaces that translate in opposite directions when the belt is rotated, each surface including a respective end carriage 36 and 38 of the product conveying belt 34.

Since the product conveying belt 34 is engaged with the carriage-positioning mechanism 40 at top and bottom carriage positions, and therefore within two different parallel planes, the product conveying belt 34 has an upper portion that extends from the first surface between the first top end carriage 36 and looping portions 74 of the product conveying belt 34 and a lower portion that extends from the second surface between the loop portion 74 and the bottom end carriage 38.

In operation of the carriage-positioning mechanism 40, actuating the motor 30 that is coupled to the roll 66 for controlled rotation thereof in either directions causes the corresponding movement of the belt 62 and the resulting translation of the carriages 36 and 38 in opposite longitudinal directions.

Since the product conveying belt 34 is engaged with the carriage-positioning mechanism 40, the mechanism 40 allows modifying the distance of the top carriage 36 relative to the product transfer conveyors 12-12'. This, in turn, allows modifying the product accumulation path or length of the accumulation conveyor 10.

A person skilled in the art will now appreciate that the belt 62 of the carriage-positioning mechanism 40 is free of the loss of tension drawback of line accumulation conveyors from the prior art by the positioning of the end return carriages 36 and 38 on two different planes and that rotates in opposite directions.

Other elements of the accumulation and product transfer conveyors are not shown in the drawings or discussed herein for concision purposes. Examples of such other elements include deflectors or rails mounted to the table 32 to force products out of the product transfer conveyor 12 on one side and back to the conveyors 12' on the other side.

It is to be noted that many modifications could be made to the single line accumulator described hereinabove and illustrated in the Figures. For example:

the product transfer and accumulation conveyors 12, 12' and 10 can be provided with their own independent drive mechanism for the respective belts 18-20 and 34;

the belt 62 of the carriage-positioning mechanism 40 is not limited to the link type. A continuous belt, made for example from an elastomeric material, can also be used;

the belt guiding elements 70 are not limited in structure and position to the illustrated embodiment;

the position and configuration of the rails 52 and 58 can be modified and be adapted to the geometry and size of the conveyed products, and so is the size of the belt 62.

It is to be understood that the single line accumulation conveyor is not limited in its application to the details of construction and parts illustrated in the accompanying drawings and described hereinabove. The line accumulation conveyor is capable of other embodiments and of being practiced in various ways. It is also to be understood that the phraseology or terminology used herein is for the purpose of description and not limitation. Hence, although the line accumulation conveyor has been described hereinabove by way of illustrative embodiments thereof, it can be modified, without departing from the spirit, scope and nature of the described embodiments.

What is claimed is:

1. A line accumulation conveyor comprising:
   a frame;
   a secondary belt rotatably mounted to the frame so as to define upper and lower surfaces that are caused to move in opposite directions by a rotation of the secondary belt; and
   a product conveying belt rotatably engaged with the secondary belt at a first position on the first surface and at a second position on the second surface therebetween in an endless manner; the product conveying belt having an upper portion that extends from the first surface in an upper plane between the first position and a looping portion of the product conveying belt and a lower portion that extends from the second surface in a lower plane between the looping portion and the second position; the upper portion of the product conveying belt defining a product accumulation path;
   whereby, in operation, the product accumulation path is modified by rotating the secondary belt.

2. The line accumulation conveyor of claim 1, wherein the product conveying belt is rotatably engaged to the secondary belt by upper and lower carriages integrated respectively into the upper and lower surfaces of the secondary belt for rotation about respective axes perpendicular to the upper and lower surfaces.

3. The line accumulation conveyor of claim 2, wherein at least one of the upper and lower carriages includes a turntable that engages and guides the product conveying belt.

4. The line accumulation conveyor of claim 1, wherein the product conveying belt is motorized by a drive mechanism.

5. The line accumulation conveyor of claim 4, wherein the drive mechanism is shared by the product conveying belt and a product transfer conveyor that is adjacent to the line accumulation conveyor and operatively coupled to the product conveying belt.

6. The line accumulation conveyor of claim 4, wherein the drive mechanism includes coupling elements that cooperate with the product conveying belt and that causes the product conveying belt to loop between the upper and lower planes.

7. The line accumulation conveyor of claim 1, further comprising a carriage-positioning mechanism that cooperates with the secondary belt to cause the secondary belt to rotate.

8. The line accumulation conveyor of claim 7, wherein the carriage-positioning mechanism includes a drive mechanism including a motor and rolls coupled to the motor and that cooperates with the secondary belt to cause the secondary belt to rotate.

9. The line accumulation conveyor of claim 1, wherein the product conveying belt is a chain belt.

10. A line accumulation conveyor comprising a product moving belt rotatably mounted between two end carriages that are so integrated into a secondary belt that the product moving belt exerts a pressure in opposite direction on the two end carriages; the product moving belt having a portion defining a product accumulation path that is variable by moving the secondary belt.

11. The line accumulation conveyor of claim 10, wherein one of the two end carriages is positioned within a first plane that includes the product accumulation path of the product moving belt and the other of the two end carriages is positioned within a secondary plane that is under the first plane generally parallel thereto.

12. A line accumulation conveyor comprising:
   a frame;
   a secondary belt rotatably mounted to the frame so as to define upper and lower surfaces that are caused to move in opposite directions by a rotation of the secondary belt;
   a product conveying belt rotatably engaged with the secondary belt by upper and lower carriages integrated respectively into the upper and lower surfaces of the secondary belt for rotation about respective axes perpendicular to the upper and lower surfaces in an endless manner; the product conveying belt being motorized by a drive mechanism; the product conveying belt having an upper portion that extends from the first surface in an upper plane between the upper carriage and a looping portion of the product conveying belt and a lower portion that extends from the second surface in a lower plane between the looping portion and the lower carriages; the upper portion of the product conveying belt defining a product accumulation path; and a carriage-positioning mechanism that cooperates with the secondary belt to cause the secondary belt to rotate;

whereby, in operation, the product accumulation path is modified by rotating the secondary belt.

* * * * *